April 6, 1937.  W. H. MUSSEY  2,076,503
ARTICULATED CAR
Filed March 8, 1935  3 Sheets-Sheet 1
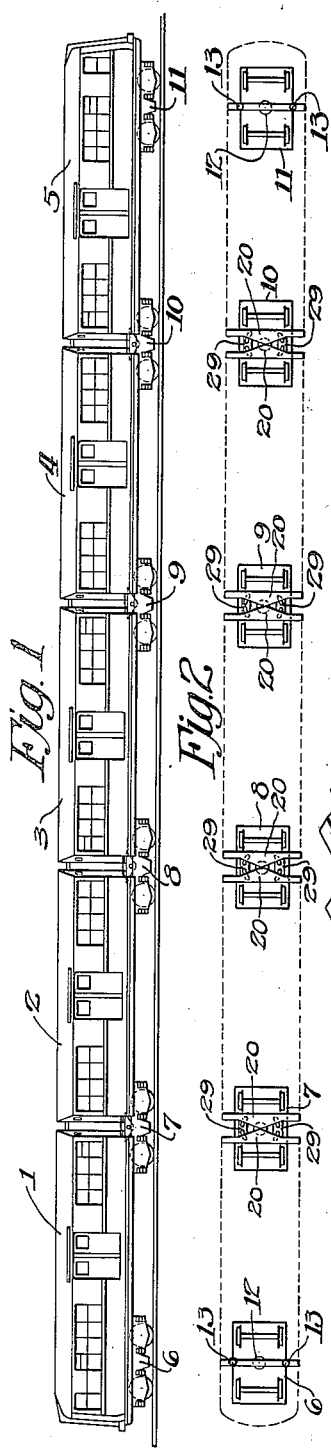
Inventor
William H. Mussey
By Dillson, Mann & Cox
Attys.

April 6, 1937.   W. H. MUSSEY   2,076,503
ARTICULATED CAR
Filed March 8, 1935   3 Sheets-Sheet 2

Inventor
William H. Mussey
By Wilson, Mann & Cox Attys.

April 6, 1937. W. H. MUSSEY 2,076,503
ARTICULATED CAR
Filed March 8, 1935   3 Sheets-Sheet 3
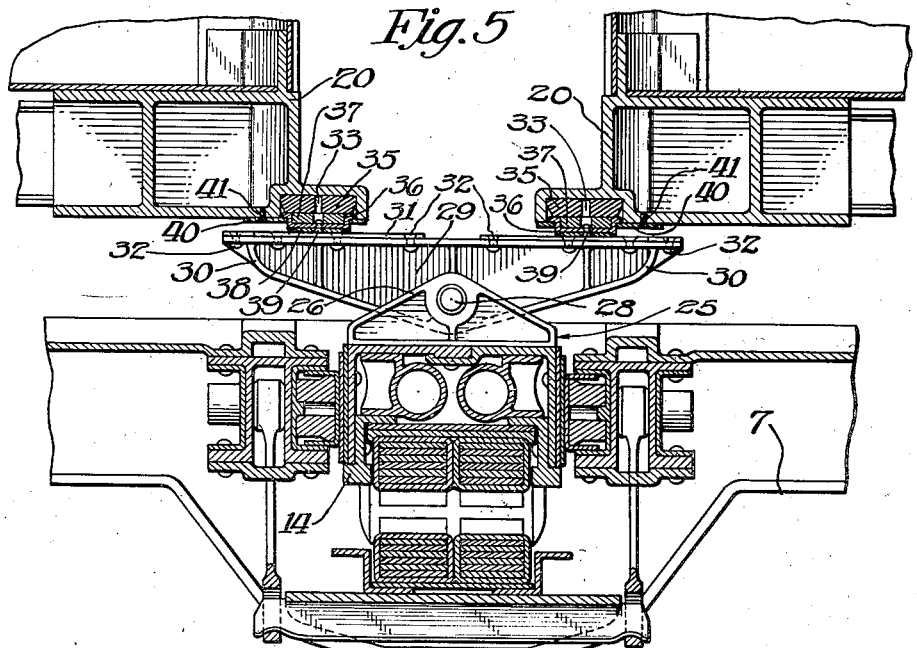
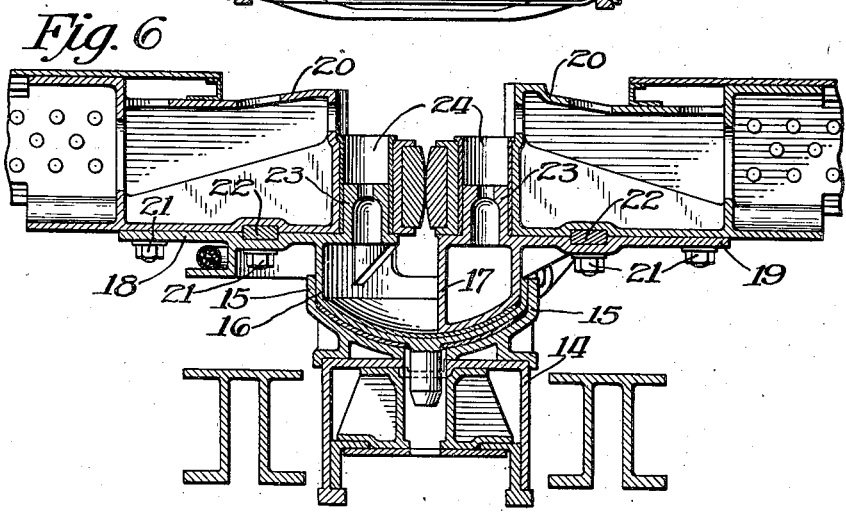
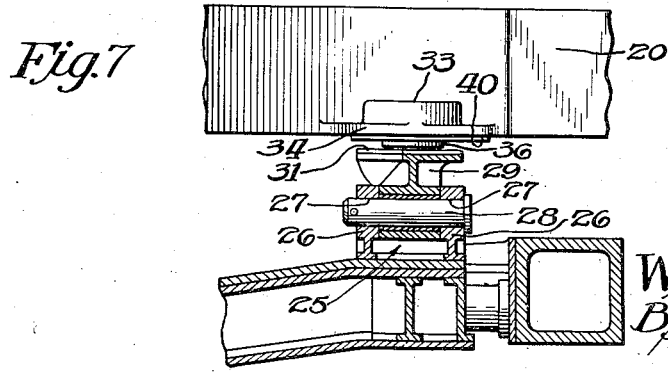
Inventor
William H. Mussey Patented Apr. 6, 1937

2,076,503

UNITED STATES PATENT OFFICE 2,076,503

ARTICULATED CAR

William H. Mussey, Chicago, Ill., assignor to Pullman-Standard Car Manufacturing Company, Chicago, Ill., a corporation of Delaware Application March 8, 1935, Serial No. 9,921

5 Claims. (Cl. 105—4)

This invention relates to cars of the type sometimes called multi-section cars, or articulated cars, in which a plurality of car bodies, or sections, are connected end to end, and adjacent ends are borne on a common truck, and the remote car ends in the series, or train have each an individual truck.

The principal object of the invention is to provide an improved side bearing structure that will permit the car bodies to go smoothly through the necessary movements in passing over the various shapes of track, but without objectionable swaying.

Further objects and advantages will become apparent as the disclosure proceeds and the description is read in connection with the accompanying drawings, in which Fig. 1 is a diagrammatic side elevation of a five-section articulated car, or train;

Fig. 2 is a diagrammatic plan view of the same;

Fig. 3 is a perspective view of the bolster of one of the common trucks, the end sills of adjacent car ends, together with the articulated joints and side bearings;

Figure 4:
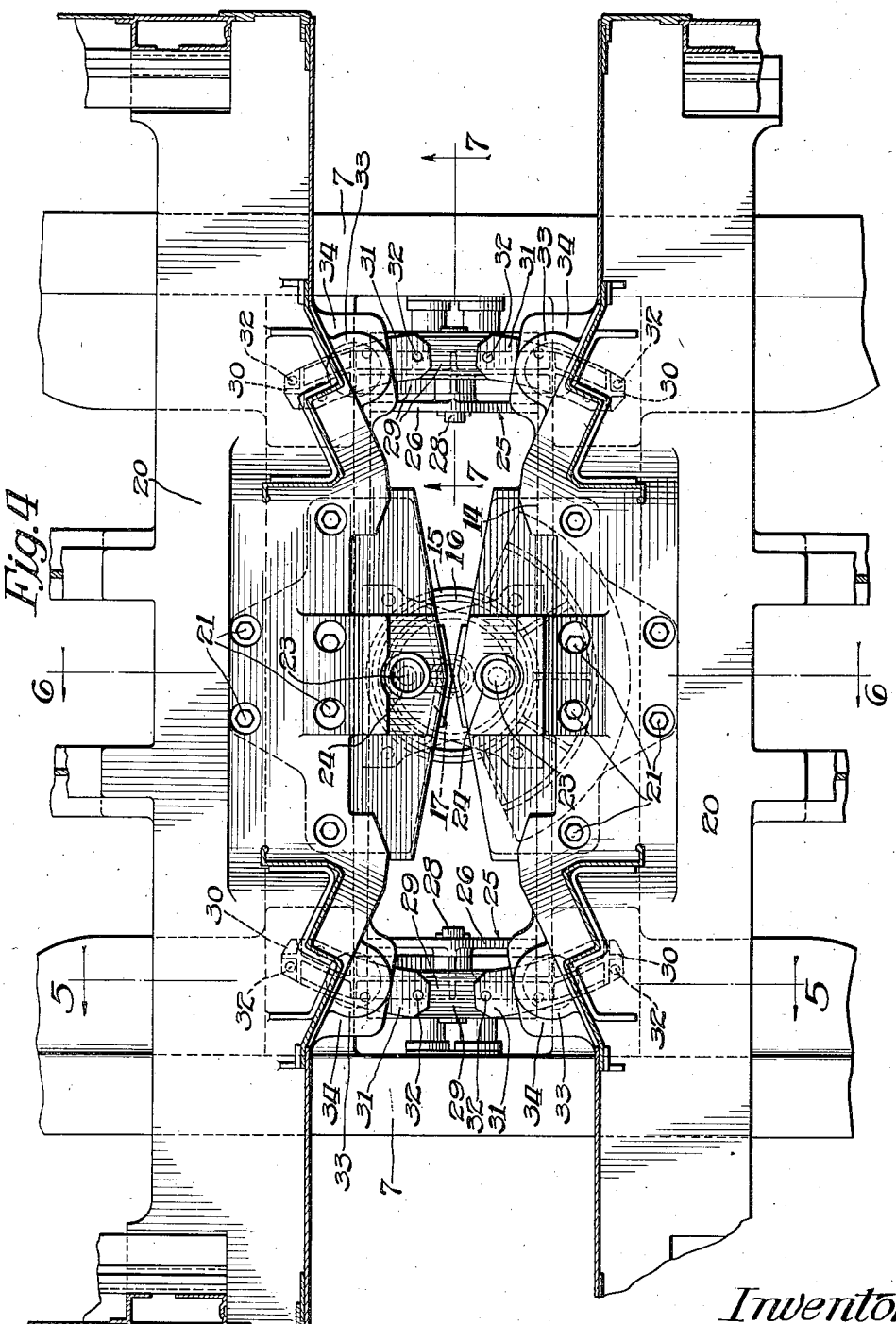
Fig. 4 is a plan view of the same.

Figs. 5, 6 and 7 are sectional views taken on the lines 5—5, 6—6 and 7—7 of Fig. 4.

Figs. 1 and 2 show five car sections, or bodies, 1, 2, 3, 4 and 5, carried by six trucks, 6, 7, 8, 9, 10 and 11, the trucks 6 and 11 being individual to the remote ends of the car bodies 1 and 5, and the trucks 7, 8, 9 and 10 being common to two adjacent ends of car bodies.

The type of truck is much a matter of selection, but the advantage of swing-motion trucks and their common use in passenger cars makes them preferable.

Each of the trucks 6 and 11 bears its car end on a center bearing 12 and side bearings 13. These are also largely a matter of selection and may be regarded as of conventional form such, for example, as are disclosed in the Car Builders Cyclopedia, 1931, section 10, but preference is given to the resilient type of side bearing. The main point is, however, that the trucks 6 and 11 bear the remote ends of the car bodies 1 and 5 in a way to resist objectionable swaying or rocking from side to side.

The intermediate trucks, 7, 8, 9 and 10 are equipped with some suitable means for giving the main support to the adjacent ends of the respective car bodies and articulate them to the truck for suitable turning movements. This can be done in a variety of ways, and for illustration it is accomplished in this embodiment by providing the truck bolster 14 (Figs. 3 and 6) with a truck center plate 15, receiving a body center plate 16 that, in turn, receives a body center plate 17. The two body center plates are integral with their respective center plate brackets 18 and 19, secured to the end sills 20 by bolts 21, keys 22 and dowels 23, the latter fitting in bushings 24, which line the dowel openings in the end sills 20.

This construction is adopted in the present instance because the end sills are of an aluminum alloy, whereas the center plate brackets are of cast steel, and the bronze bushings 24 are used to prevent the steel dowels from working loose in the aluminum openings.

At each end the bolster 14 is equipped with a cradle, or bracket, 25, having spaced flanges 26, pierced at 27 to receive a fulcrumed pivot pin 28 of a side bearing lever 29 having inwardly curved arms 30 projecting in opposite directions beneath the adjacent end sills 20, and provided on their upper flat faces with wear strips 31 of manganese steel made fast by countersunk rivets 32.

Each end sill has a downwardly opening circular pocket 33 (Fig. 5) formed partly in the end sill and partly in a flange 34, and in the pocket is seated a rubber pad 35 against the under face of which is a flanged cup 36 of metal, filled with a block of wood 37 and faced with a self lubricating disk 38 made fast by countersunk rivet 39.

As actually constructed heretofore this disk 38 was made of porous metal charged with a lubricant, and known in the trade as Oilite.

The cup 36 is held in place compressing the pad by a metal plate 40 fastened to the underside of the sill 20 by screws 41.

With this construction any tendency of the car body 2, 3 or 4, to rock, or sway, acts through the side bearing levers to communicate an opposite tendency to the adjacent car bodies, and it is therefore resisted by the inertia of those bodies and also by the stable support of the car bodies 1 and 5 on the trucks 6 and 11.

As a result, the several car bodies are permitted to take the necessary movements for passing over the curves and inequalities in the track, but objectionable swaying is prevented.

I claim:

1. In an articulated car, a truck, car bodies having adjacent ends carried by the truck, and side bearings on the truck, each comprising a rigid lever pivoted on the truck to rock about a fixed axis transverse to the truck, and having arms of substantially equal length extending outwardly beneath each of the adjacent car ends, each arm having means for engaging said car ends.

2. In an articulated car, a truck common to two car bodies having adjacent ends supported thereon, each pivoted to swing about a vertical axis, and side bearings comprising a rigid lever pivoted at each side of the truck to rock about a fixed axis transverse to the truck and having arms of substantially equal length extending outwardly beneath each of the adjacent car ends, each arm having means for engaging said car ends.

3. In an articulated car, a truck, a lever at each side of the truck, and having arms lengthwise to the truck, pivoted on the truck to rock about a fixed transverse axis, and side bearings on the car bodies, each comprising a resilient pad and a shoe to cooperate with a flat upper surface of one of the lever arms.

4. In an articulated car, a plurality of car bodies connected end to end in a train with the adjacent car body ends on a common truck and the remote car body ends of the train each on an individual truck, the support on each individual truck including side bearings to restrain the car body from rolling laterally, and the common trucks having side bearings, each including a lever pivoted on the truck to rock about a fixed axis transverse to the truck and having an arm having a flat upper surface cooperating with each adjacent car body.

5. In an articulated car, a truck, car bodies having adjacent ends carried by the truck, and side bearings on the truck, each comprising a rigid lever pivoted on the truck to rock about a fixed axis transverse to the truck, and having arms of substantially fixed length extending outwardly beneath each of the adjacent car ends, each arm having means for engaging said car ends.

WILLIAM H. MUSSEY.